(12) United States Patent
Toner et al.

(10) Patent No.: US 10,345,619 B2
(45) Date of Patent: Jul. 9, 2019

(54) THINNED AND FLEXIBLE CIRCUIT BOARDS ON THREE-DIMENSIONAL SURFACES

(71) Applicant: Johnson & Johnson Vision Care, Inc., Jacksonville, FL (US)

(72) Inventors: Adam Toner, Jacksonville, FL (US); James Daniel Riall, St. Johns, FL (US); Sharika Snook, St. Augustine, FL (US); Dawn Jamisha Owens, Jacksonville, FL (US); Marina Archer, Ponte Vedra, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 14/662,382

(22) Filed: Mar. 19, 2015

(65) Prior Publication Data
US 2016/0274377 A1 Sep. 22, 2016

(51) Int. Cl.
*G02C 7/04* (2006.01)
*G02C 7/08* (2006.01)

(52) U.S. Cl.
CPC .............. *G02C 7/083* (2013.01); *G02C 7/04* (2013.01); *G02C 7/048* (2013.01); *G02C 7/049* (2013.01)

(58) Field of Classification Search
None
See application file for complete search history.

(56) References Cited

U.S. PATENT DOCUMENTS

| | | | |
|---|---|---|---|
| 2003/0231293 A1* | 12/2003 | Blum | G02B 27/017 356/5.01 |
| 2008/0208335 A1* | 8/2008 | Blum | A61F 2/1616 623/6.22 |
| 2010/0076553 A1 | 3/2010 | Pugh et al. | |
| 2010/0078838 A1 | 4/2010 | Pugh et al. | |
| 2010/0110372 A1 | 5/2010 | Pugh et al. | |
| 2010/0239637 A1* | 9/2010 | Ciolino | A61F 9/0017 424/429 |
| 2010/0316877 A1* | 12/2010 | Song | C08G 73/10 428/458 |
| 2012/0235277 A1* | 9/2012 | Pugh | G02C 11/10 257/532 |
| 2013/0194540 A1* | 8/2013 | Pugh | A61F 2/1635 351/159.03 |
| 2013/0225968 A1 | 8/2013 | Auvray et al. | |

(Continued)

FOREIGN PATENT DOCUMENTS

| | | |
|---|---|---|
| EP | 2620802 A1 | 7/2013 |
| EP | 2712282 A2 | 3/2014 |

(Continued)

OTHER PUBLICATIONS

European Search Report dated Aug. 23, 2016 for corresponding EPA No. 16161187.6.

*Primary Examiner* — Ricky L Mack
*Assistant Examiner* — Journey F Sumlar

(57) ABSTRACT

Thinned, flexible surface regions upon which flexible active components may be utilized to attach flexible active components in space/volume constrained devices, for example, a powered ophthalmic device. Thinned, flexible surface regions foster an avenue for enhanced functionality because various electronic circuits and components can be integrated into polymeric structures.

10 Claims, 8 Drawing Sheets

(56) References Cited

U.S. PATENT DOCUMENTS

| | | | |
|---|---|---|---|
| 2014/0028969 A1* | 1/2014 | Pugh | G02C 7/083 351/159.4 |
| 2014/0290054 A1 | 10/2014 | Etzkorn | |
| 2015/0077663 A1* | 3/2015 | Pugh | G02C 7/083 349/13 |

FOREIGN PATENT DOCUMENTS

| | | |
|---|---|---|
| EP | 2843461 A1 | 3/2015 |
| EP | 2848981 A | 3/2015 |

* cited by examiner

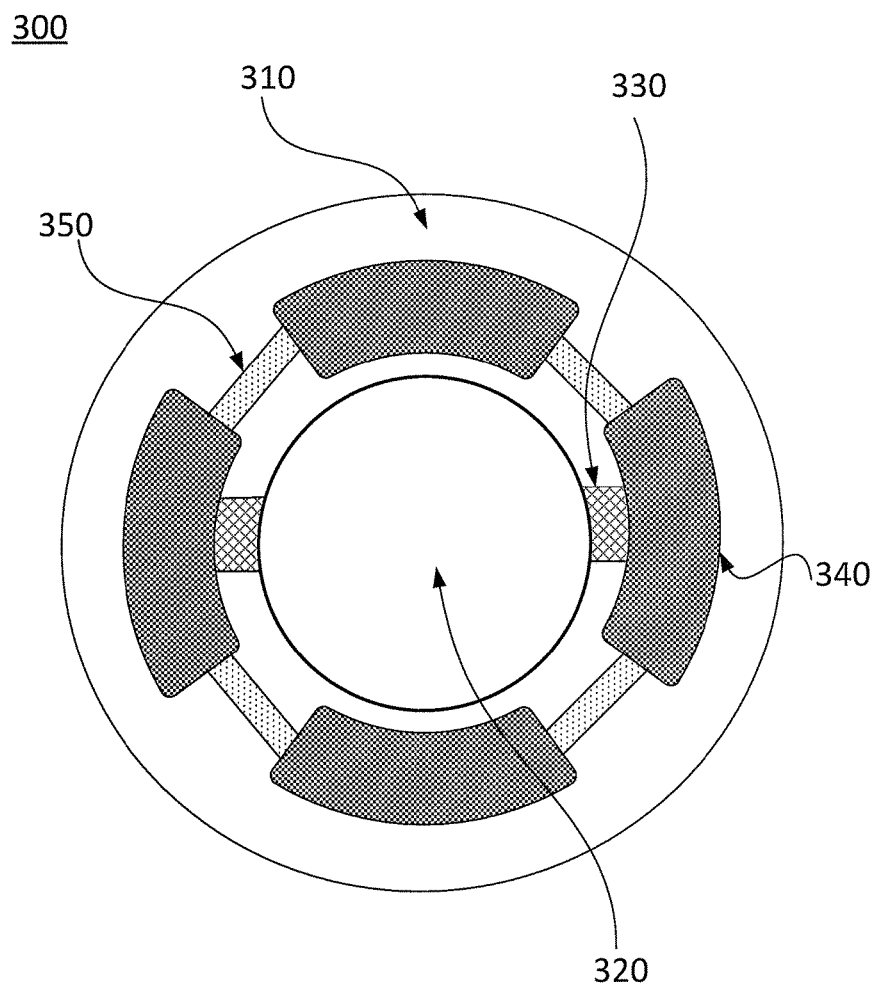

510

520

531

532          530

FIG. 7A
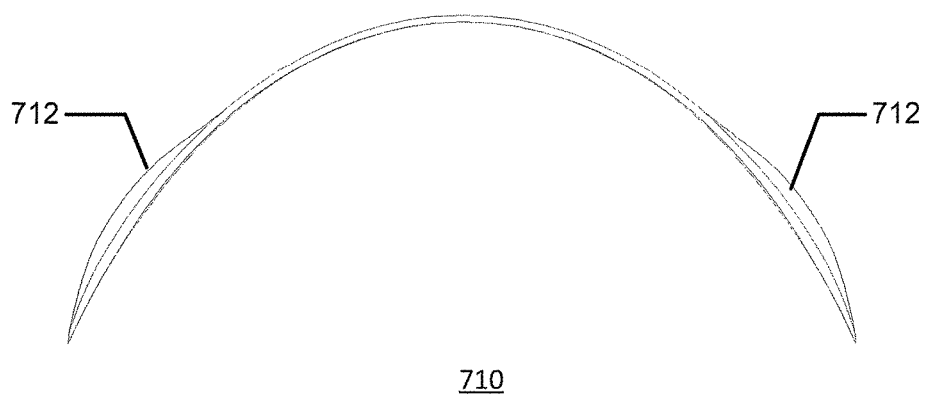
710
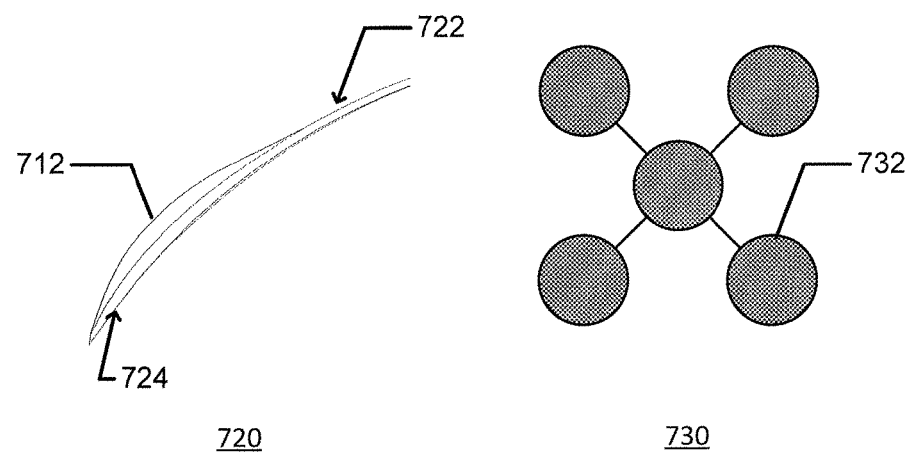
720
FIG. 7B
730
FIG. 7C

THINNED AND FLEXIBLE CIRCUIT BOARDS ON THREE-DIMENSIONAL SURFACES

BACKGROUND OF THE INVENTION

1. Field of the Invention

The present invention relates to methods to form a device that includes flexible circuit board elements skirting the optical zone of a powered ophthalmic lens or similar device. More specifically, the flexible circuit board may be deformed or bent in order to attach to three-dimensionally shaped or flexible active components.

2. Discussion of the Related Art

As electronic devices continue to be miniaturized, it is becoming increasingly more likely to create wearable or embeddable microelectronic devices for a variety of uses. Such uses include monitoring aspects of body chemistry, administering controlled dosages of medications or therapeutic agents via various mechanisms, including automatically, in response to measurements, or in response to external control signals, and augmenting the performance of organs or tissues. Examples of such devices include glucose infusion pumps, pacemakers, defibrillators, ventricular assist devices and neurostimulators. A new, particularly useful field of application is in ophthalmic wearable lenses and contact lenses. For example, a wearable lens may incorporate a lens assembly having an electronically adjustable focus to correct refractive errors and/or augment or enhance performance of the eye. In another example, either with or without adjustable focus, a wearable contact lens may incorporate electronic sensors to detect concentrations of particular chemicals in the precorneal (tear) film. The use of embedded electronics in a lens introduces a potential requirement for communication with the electronics, for a method of powering and/or re-energizing the electronics, for interconnecting the electronics, for internal and external sensing and/or monitoring, and for control of the electronics and the overall function of the lens.

The human eye has the ability to discern millions of colors, adjust easily to shifting light conditions, and transmit signals or information to the brain at a rate exceeding that of a high-speed internet connection. Lenses, such as contact lenses and intraocular lenses, currently are utilized to correct vision defects such as myopia (nearsightedness), hyperopia (farsightedness), presbyopia, and astigmatism. However, properly designed lenses incorporating additional components may be utilized to enhance vision as well as to correct vision defects.

Contact lenses may be utilized to correct myopia, hyperopia, astigmatism as well as other visual acuity defects. Contact lenses may also be utilized to enhance the natural appearance of the wearer's eyes. Contact lenses or "contacts" are simply lenses placed on the anterior surface of the eye. Contact lenses are considered medical devices and may be worn to correct vision and/or cosmetic or other therapeutic reasons. Contact lenses have been utilized commercially to improve vision since the 1950s. Early contact lenses were made or fabricated from hard materials, were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Specifically, silicone hydrogel contact lenses that are available today combine the benefit of silicone, which has extremely high oxygen permeability, with the proven comfort and clinical performance of hydrogels. Essentially, these silicon hydrogel based contact lens have higher oxygen permeability and are generally more comfortable to wear than the contact lenses made of the earlier hard materials.

Conventional contact lenses are polymeric structures with specific shapes to correct various vision problems as briefly set forth above. To achieve enhanced functionality various electronic circuits and components have to be integrated into these polymeric structures. For example, control circuits, microprocessors, communication devices, power supplies, sensors, actuators, light-emitting diodes, and miniature antennas may be integrated into contact lenses via custom-built optoelectronic components to not only correct vision, but to enhance vision as well as provide additional functionality as is explained herein. Electronic and/or powered contact lenses may be designed to provide enhanced vision via zoom-in and zoom-out capabilities, or just simply modifying the refractive capabilities of the lens. Electronic and/or powered contact lenses may be designed to enhance color and resolution, to display textual information, to translate speech into captions in real time, to offer visual cues from a navigation system, and to provide image processing and internet access. The lenses may be designed to allow the wearer to see in low-light conditions. The properly designed electronics and/or arrangement of electronics on lenses may allow for projecting an image onto the retina, for example, without a variable-focus optic lens, provide novelty image displays and even provide wake up alerts. Alternately, or in addition to any of these function or similar functions, the contact lens may incorporate components for the noninvasive monitoring of the wearer's biomarkers and health indicators. For example, sensors built into the lenses may allow a diabetic patient to keep tabs on blood sugar levels by analyzing components of the tear film without the need for drawing blood. In addition, an appropriately configured lens may incorporate sensors for monitoring cholesterol, sodium, and potassium levels, as well as other biological markers. This, coupled with a wireless data transmitter, could allow a physician to have almost immediate access to a patient's blood chemistry without the need for the patient to waste time getting to a laboratory and having blood drawn. In addition, sensors build into the lenses may be utilized to detect light incident on the eye to compensate for ambient light conditions or for use in determining blink patterns.

The proper combination of devices could yield potentially unlimited functionality; however, there are number of difficulties associated with the incorporation of extra components on a piece of optical-grade polymer. In general, it may be difficult to manufacture such components directly on the lens for a number of reasons, as well as mounting and interconnecting planar devices on a non-planar surface. It may also be difficult to manufacture to scale. The components to be placed on or in the lens need to be miniaturized and integrated onto just 1.5 square centimeters (assuming a lens with a 7 mm radius) of the transparent polymer while protecting components from the liquid environment on the eye. It may also be difficult to make a contact lens comfortable and safe for the wearer with the added thickness of additional components.

More specifically, the 1.5 square centimeters of transparent polymer represents the entire area of the contact lens. In certain exemplary embodiments, it is preferable that the electronics be in the periphery of the lens and out of the optic zone. Alternate exemplary embodiments are also possible utilizing thin-film materials or transparent silicon. In the above example, if the center eight (8) mm diameter portion (4 mm radius) is reserved for the optic zone, then at most one (1) square centimeter is left for the electronics. Future designs may offer even less area for electronics, for example, there may be designs with annular rings of about 0.017 square centimeters (17 square millimeters) not including the variable-focus optic. In other words, what is needed in the present invention is a design and configuration that allows for incorporation of all the components necessary to exploit the aforementioned unlimited functionality.

Given the area and volume constraint of an ophthalmic device such as a contact lens, and the environment in which it is to be utilized, the physical realization of the device must overcome a number of problems, including mounting and interconnecting a number of electronic components on a non-planar surface, the bulk of which comprises optical grade plastic. Accordingly, there exists a need for providing a mechanically and electrically robust electronic contact lens.

The topology and size of the space defined by the lens structure creates a novel and challenging environment for the investigation of virtually unlimited functionality of an ophthalmic device. In many embodiments, it is important to provide reliable, compact, and cost effective means to incorporate components within an ophthalmic device. In some embodiments, it may be advantageous to include thin and flexible surfaces upon which electrical components may be mounted. As a result, novel methods and form factor solutions that may allow for modulation of flexibility of some components are desired both for improvements in the production of ophthalmic devices and for the general advancement of incorporating electronic components on non-flat substrates. It is important to note these improvements may find use in non-ophthalmic applications as well. It is also desirable that methods be generated to address ophthalmic and non-ophthalmic requirements as they relate to electronic components on three-dimensional substrates.

SUMMARY OF THE INVENTION

The thinned and flexible circuit board elements in accordance with the present invention overcomes the disadvantages associated with the prior art as briefly described above.

In accordance with one aspect, the present invention is directed to a powered ophthalmic device. The powered ophthalmic device comprising a lens having an optic zone and a peripheral zone surrounding the optic zone, an insert positioned within the lens and occupying at least a portion of the optic zone, one or more interconnection structures mounted to the insert, and one or more flexible flaps connected to the one or more interconnection structures, the one or more flaps configured as mounting and support structures for one or more electronic components.

In accordance with another aspect, the present invention is directed to interconnection structures for a powered ophthalmic device. The interconnection structures comprising a flexible insulating substrate deployed along the circumference of an ophthalmic device having an optic zone, a peripheral zone surrounding the optic zone, and a skirt zone surrounding the peripheral zone, wherein the flexible insulating substrate occupying at least a portion of the peripheral zone and the skirt zone, and at least one attachment point formed on the flexible insulating substrate.

In accordance with yet another aspect, the present invention is directed to flaps for a powered ophthalmic device. The flaps comprising a surface region deployed along the circumference of an ophthalmic device having an optic zone, a peripheral zone surrounding the optic zone, where in the surface region is occupying at least a portion of the peripheral zone of the ophthalmic device, one or more interconnection structures are connected to the surface region, and one or more flexible electrical components are mounted on top of the surface region.

In accordance with still yet another aspect, the present invention is directed to a powered ophthalmic device. The powered ophthalmic device comprising an encapsulating and shaping hydrogel layer forming a lens having a front curve and a back curve, the lens comprising an optic zone, a peripheral zone surrounding the optic zone, and a skirt zone surrounding the peripheral zone, one or more flaps positioned within the lens and occupying at least a portion of the peripheral zone, and one or more interconnection structures attached to one or more flaps occupying at least a portion of the peripheral zone.

The present invention describes techniques and design implementations that relate to the utilization of thinned flexible surface regions upon which flexible active components may be attached to an electronic and/or powered ophthalmic device. In some exemplary embodiments the resulting surface region may be adhered to an assembled rigid front optic or simply embedded into a lens to enhance the ophthalmic device functionality. Furthermore, the present invention discloses methods of modulating the flexibility and incorporating flaps into space-defining and/or functional structures.

A feature used in an ophthalmic device that may describe a flexible surface region where flexible components may be attached, may derive from shapes referred to as flaps. Flaps are regions which may be deployed along the general surface shape of the ophthalmic device. The flaps may be flat/planar or non-flat/non-planar. In the case of non-flat flaps, the surface topology of the flap may vary in multiple directions; however, a typical case would occur with variation in both a radial direction of the ophthalmic device and in a tangential direction of the ophthalmic device. Flexible devices may be deployed upon the surface of these flaps and interconnected in numerous ways, including by the use of interconnects which are formed upon the larger surfaces of the flap features. Different flap designs may be used in an electronic and/or powered ophthalmic device to increase the eye's oxygen exposure.

Many different designs for the space-defining structures and regions therein may exist depending on the desired characteristic of the device. The different designs may result in complex three-dimensional surfaces within the regions that may sometimes require flexibility of some or all the device components. For example, in cylindrical designs modeled to be positioned around an ophthalmic device component, a flexible surface may circumscribe at least a portion or the entire circumference of the optic zone. In some exemplary embodiments, the flexible surface regions may include designs that are truncated conical frustum shaped. The cylindrical design feature share some similarity to the flat-cone features; however, they differ in that in a flat-cone feature the dimension of the top radial path and the bottom radial path of the bent surface may be different. Additional types of device characteristics may dictate the surface region where flexible devices may be attached. In some exemplary embodiments, the surface regions may include circular flexible surfaces positioned around the optic region in a fashion similar to zones of stability in a toric contact lens. Alternative exemplary embodiments may include flexible helical structures encapsulating the optic region.

Numerous techniques and designs that may be used to position thinned and flexible circuit board elements within or on different three-dimensional surface will be apparent to one skilled in the art from the techniques and examples described herein. In some aspects of the present invention, the techniques and designs may provide for additional or improved functionality of the device itself, i.e. techniques for modulating flexibility. In some exemplary embodiments relating in particular to ophthalmic lenses, a technique utilized to reduce the rigidity of the electronic and/or powered ophthalmic device, includes incision or density modulation techniques.

BRIEF DESCRIPTION OF THE DRAWINGS

The foregoing and other features and advantages of the invention will be apparent from the following, more particular description of preferred embodiments of the invention, as illustrated in the accompanying drawings.

FIG. 3 is a planar view of an exemplary three-dimensional substrate that integrates truncated conical frustum flaps with nodal connections for incorporation into an ophthalmic device in accordance with the present invention.

FIGS. 7A-7C illustrate an orthographic side view of an ophthalmic device with stability features, and representation of a flap design for incorporation into the stability feature in accordance with the present invention.

DETAILED DESCRIPTION OF THE PREFERRED EMBODIMENTS

The present invention describes techniques and design implementations that relate to the utilization of thinned, flexible surface regions upon which flexible active components may be attached to an electronic and/or powered ophthalmic device. In some exemplary embodiments the resulting surface region may be adhered to an assembled rigid optic or simply embedded into a lens to enhance the ophthalmic device functionality. Furthermore, the present invention teaches methods of modulating the flexibility and incorporating flaps into space-defining and/or functional structures, which is important for creating the optimal electronic and/or ophthalmic device and allows for electronic components beyond certain mechanical constraints which may include a rigid insert diameter limited to 10.0 millimeters or less.

Figure 1:
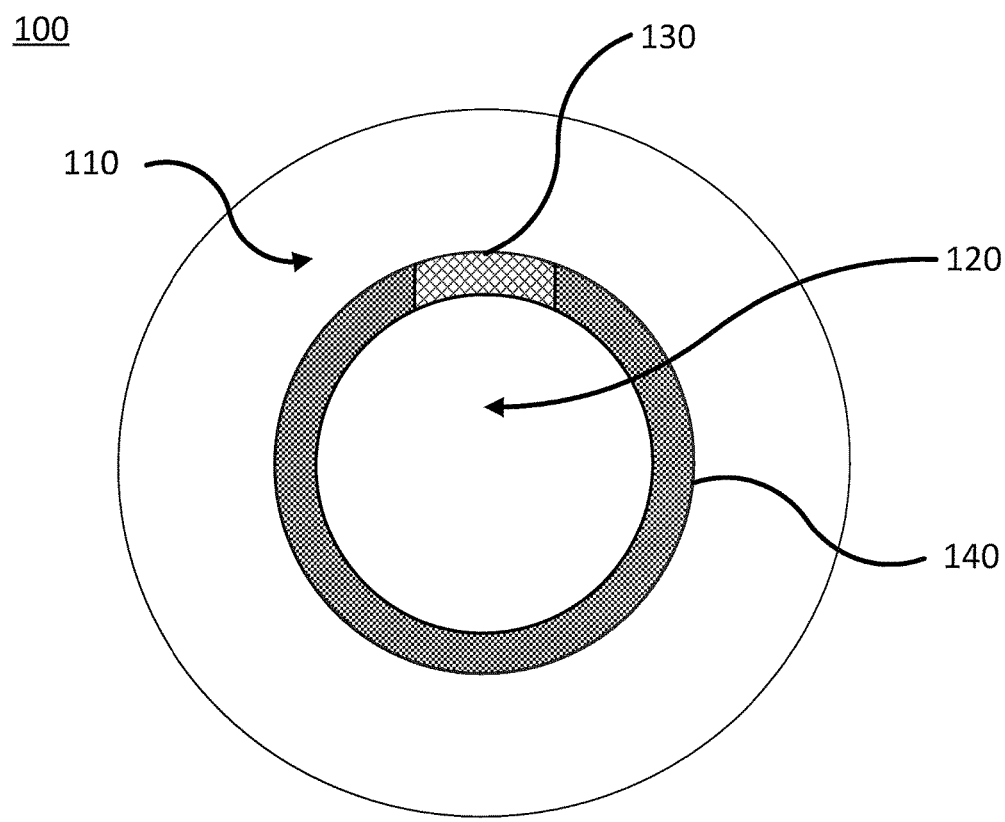
FIG. 1 is a planar view of an exemplary three-dimensional substrate that may be used in an exemplary ophthalmic device in accordance with the present invention.

Referring to FIG. 1, there is illustrated, in planar view, a first exemplary embodiment of a three-dimensional device 100 for use in ophthalmic devices. The three-dimensional device 100 refers to a formable or rigid substrate insert capable of supporting electronic components within an ophthalmic lens. In some exemplary embodiments, the substrate insert may include a rigid optic zone or rigid structure occupying at least a portion of the optic zone functionalized to include a variable focusing element. At 110, the material, which may preferably comprise hydrogel polymer, that the ophthalmic device may be formed from is depicted. An insert including a rigid optic zone 120 may be included within the polymerized hydrogel material. The rigid optic zone 120 may overlay only a portion or the entire optic zone, ranging in diameter from 1 millimeter to 10 millimeters. However, the diameter limit of the rigid optic zone 120 is often dictated by the overall diameter of the polymerized hydrogel material 110 that the rigid optic zone 120 is embedded in. Incorporation of rigid optic zone 120 makes flexibility a dominant concern for buckling purposes because, as the diameter of the rigid insert increases, especially in comparison to the hydrogel skirt diameter, removal of the lens from the eye becomes more difficult.

An interconnection structure 130 may be connected around a quarter (ninety degrees) of the rigid optic zone structure 120. In some exemplary embodiments, the interconnection structure size may be modulated to cover various circumferences of the rigid optic zone or several small nodes may be spatially dispersed around the circumference of the insert occupying the optic zone. The interconnection structure 130 may be a flexible insulating substrate, formed in three dimensions, upon which metallized traces or electrical contacts may be deposited or otherwise formed. For example, an interconnection structure 130 may be a flexible mechanical interconnect, or thin flexible electrical traces, which preferably comprises a thin flexible polymer, flexible polyimide, or a metallized polyimide film. When the interconnection structure 130 is formed, a flexible two-hundred and seventy degree circular flap 140 may be attached or affixed as shown. Flaps may be formed from any suitable material. For example, the flap 140 may be formed from a thin flexible polymer. More specifically, the flap 140 may be formed from polyimide film. Flaps are preferably formed using a flexible metallized polyimide film such as Kapton® from DuPont, Apical® Polyimide Film from Kaneka, Upilex® from UBE Industries, Norton® Polyimide Film TH Series from Saint-Gobain, or Kaptrix® Polyimide Film from DuPont. Other materials such as metalized flexible ceramic films, flexible thin silicon or silica based substrates, metalized polymer films, Polytetrafluoroethylene (PTFE), filled PTFE, liquid crystal polymer (LCPS), etc., may also be used. In other exemplary embodiments, design constraints and functionality requirements may require the use of other suitable materials. Additionally, the angular size of the flap and interconnect may be adjusted to optimize various design goals including mechanical robustness, number of electrical interconnects, functionality, and size.

Figure 2A:
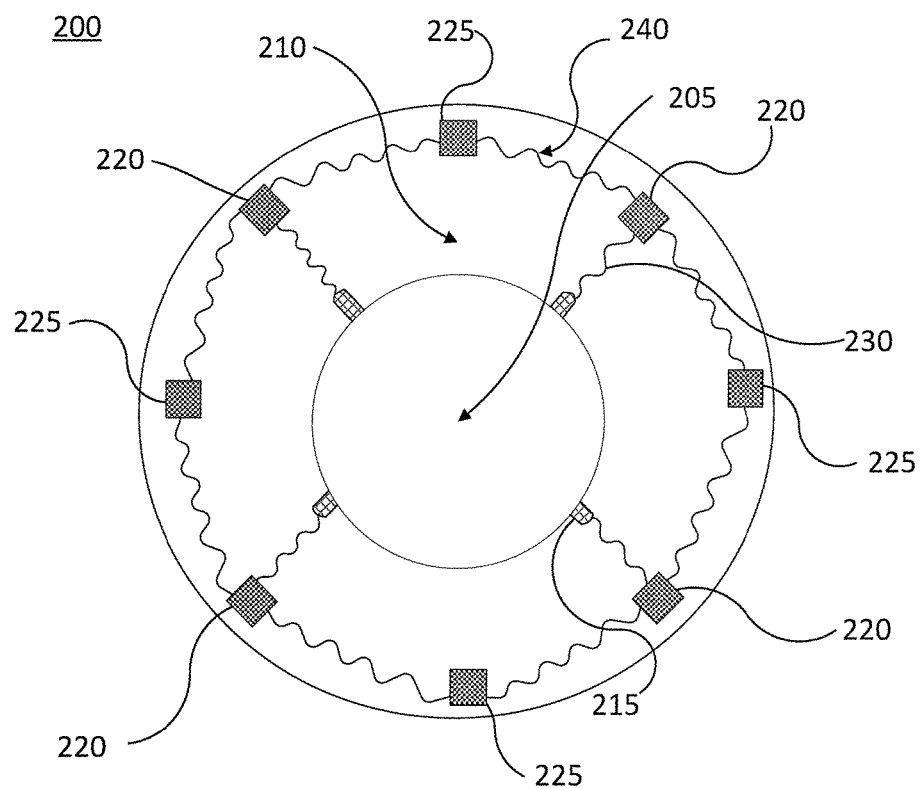
FIGS. 2A-2B illustrate an exemplary flap web structure for incorporation into an ophthalmic device in accordance with the present invention.
Figure 2B:
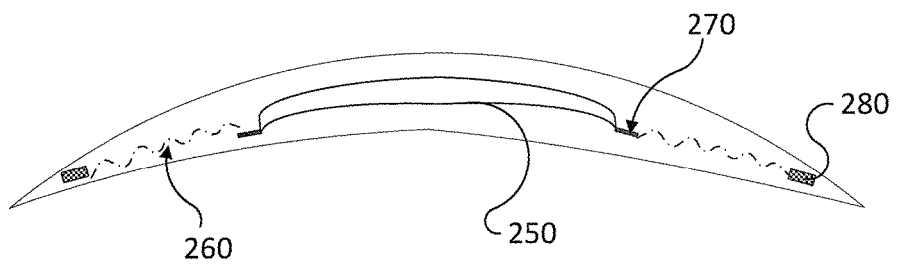

FIGS. 2A and 2B illustrate, in planar and side view, a second three-dimensional device 200 for use in ophthalmic devices. Different ophthalmic device embodiments may be formed upon the exemplary three-dimensional substrate. In the exemplary ophthalmic device of FIG. 2, the three-dimensional device 200 may include a region that is augmented to decrease the customary flexibility of an optic zone, preferably comprised solely of hydrogel polymer, thus forming a hybrid optic zone 205. Note that it is not typical to decrease the flexibility of an active ophthalmic device, but the decrease may be a consequence of functionalizing the optic zone. Additionally, in contrast to a rigid optic structure, which may be designed to function as variable focusing element, hybrid or non-rigid inserts occupying the optic zone may be solely used as a support structure or a mechanism for ensuring no obstruction of the pupil diameter while incorporating additional elements in the ophthalmic device. If the device is a hybrid optic structure, the region 205 may represent a front surface of an insert device that comprises interconnection nodes spatially located around the circumference of the region. Outside of this region, there may typically be a peripheral region of the ophthalmic device that is not in an optically relevant path. Placing components at a diameter outside of the optic zone proves beneficial in several aspects. For example, antennas placed in the peripheral region may have improved gain, due to the larger area afforded by a larger diameter, which may strengthen communication between supplemental devices or with other performance enhancing technologies. Moreover, locating sensors in the peripheral region enhances access to the ciliary muscle, which is outside this iris diameter. The ciliary muscle is responsible for rapid changes in focus as well as controlling part of the drainage system of the eye to maintain the proper fluid pressure in the eye. Proximity to the ciliary muscle may provide vital knowledge regarding the eye's ability to adjust focus or how rapidly the eye possesses the ability to adjust focus, and facilitate noninvasive monitoring of various biomarkers for ocular and systemic diseases. Accordingly, it may be appropriate to place components related to electrical, mechanical, or chemical sensing, communication, or other functions outside the optic zone. Chemical sensing may include detecting concentrations of particular chemicals in the precorneal film. Electrical sensing may include impedance sensing due to proximity to the ciliary muscle. Additionally, the components may be placed on top of the flaps and electrically connected to each other by electrical traces or flexible mechanical interconnects.

In some exemplary embodiments, depending upon the desired functionality, sensors may be built into the lens to activate certain lens functions or to conduct noninvasive monitoring of biomarkers or genetically pre-disposed health concerns. In either of these examples, there may be at a minimum one miniature contoured flap 220, which will house the proper components to execute the desired functionality of the ophthalmic device. Specifically, FIG. 2A illustrates satellite sensor nodes connected by flexible traces, comprising a hybrid optic zone 205, interconnection nodes 215, miniature contoured flaps 220 and 225, and electrical traces 230 and 240, which upon assembly, as described in greater detail below, may be embedded into material that may preferably comprise hydrogel polymer 210. Note that in some exemplary embodiments, a soft optic zone may be utilized instead of the hybrid optic zone 205.

At 200, it may be observed that the miniature contoured flaps 220 and 225 are structured in a manner as to create a network surrounding the hybrid optic zone 205. The present exemplary embodiment features miniature contoured flaps that are graticulate, but other exemplary embodiments may include topologies with different shapes, including botryoidal, acicular, gusset, prolate, lozenge, mammilated, rhombus or rhomboid, or freeform contours arranged in a network or reticulum fashion. The specified design or topology may be dictated by the desired functionality, electrical and mechanical robustness, comfort, and reduced rigidity. The miniature contoured flaps 220 and 225 may range in area from about 1 square micron to more than 1 square millimeter. It may be observed that the miniature contoured flap 220 is directly attached to hybrid optic zone 205 via an electrical trace 230 which is fastened to the interconnection node 215 forming the foundational structure for the network or reticulum. As illustrated, the interconnection node 215 is preferably composed of a porous material to reduce rigidity, as they are the building block for the reticulum. Additional miniature contoured flaps 225 are incorporated into the network via electrical traces 240 forming a bridge between the miniature contoured flaps 220 which may form the foundational structure. Limiting the number of flaps connected directly to the hybrid optic zone increases flexibility of the ophthalmic device and may improve buckling of the device to aid in lens removal.

The miniature contoured flaps 220 may also be observed in the cross section at 280 in FIG. 2B, resting in the peripheral zone attached via electrical traces 260 to the hybrid optic zone 250 which preferably comprises interconnection nodes 270.

FIG. 3 illustrates, in planar view, an alternative exemplary embodiment of a three-dimensional device for use in an ophthalmic device. At 300, the three-dimensional device comprises a rigid optic zone which may be functionalized to include a variable focusing element encapsulated, to some degree, by flexible polyimide substrates which may reinforce electronic components. At 310, the material, which may preferably comprise hydrogel polymer, that the ophthalmic device may be structured from is depicted. The rigid insert 320 may be embedded in the optic zone of the polymerized hydrogel material 310 that forms the ophthalmic device. Interconnection nodes 330 may be affixed around the circumference of the rigid insert 320. Additional types of device characteristics may dictate the surface region where the interconnection nodes 330 may be attached. The interconnection nodes 330 may be flexible insulating substrates formed in three dimensions upon which metallized traces may have been deposited or otherwise formed. Truncated conical frustum shaped flaps 340 may be affixed, attached or appended to the interconnection nodes 330. In some exemplary embodiments the flaps 340, interconnection nodes 330, and rigid insert 320 may be affixed or attached to each other via any suitable means, for example soldering, conductive epoxy, electromechanical joints, crimps, ultrasonic bonding, or conductive adhesive tape. By way of generalization, it may be obvious to one skilled in the art that the suitable method of attaching and/or appending the components may require use of one or more attachment methods.

A varying number of truncated conical frustum shaped flaps 340 may be positioned in the peripheral region of the ophthalmic device to enclose the optic zone. Flexible mechanical interconnects 350 may be used to concentrically arrange the truncated conical frustum shaped flaps 340 around the perimeter of the optic zone. The thickness of the flexible mechanical interconnects 350 and the truncated conical frustum shaped flaps 340 may be modulated to create a notable disparity of thickness which augments the flexibility of the ophthalmic device. Flexibility is preferably optimized to ensure adequate buckling, which assists the wearer's ability to pinch the ophthalmic device for removal from the eye.

Figure 4:
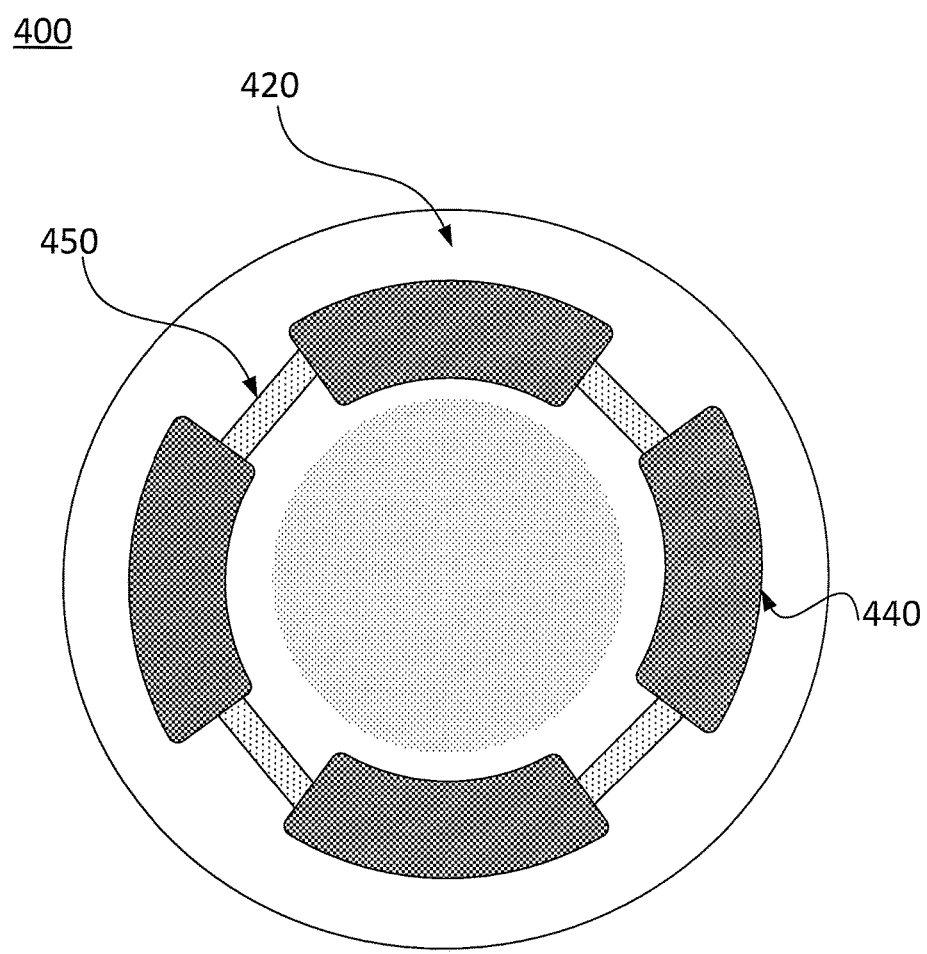
FIG. 4 is a planar view of an alternate exemplary three-dimensional substrate that integrates truncated conical frustum flaps with nodal connections for incorporation into an ophthalmic device in accordance with the present invention.

FIG. 4 illustrates, in planar view, another three-dimensional exemplary embodiment of a structure 400 for use in an ophthalmic device. At 420, the material, which may preferably comprise hydrogel polymer, that the ophthalmic device may be formed from is shown. Truncated conical frustum shaped flaps 440 are affixed to flexible mechanical interconnects 450 and concentrically arranged with a diameter ranging between 1.0 mm to 18.0 mm, and preferably ranging from 6.0 to 10.0 mm. Conforming to this diameter range ensures that the circular/annular structure rests in the peripheral region of the ophthalmic device rather than in the soft optic zone which preferably comprises the polymerized hydrogel material 420.

Figure 5A:
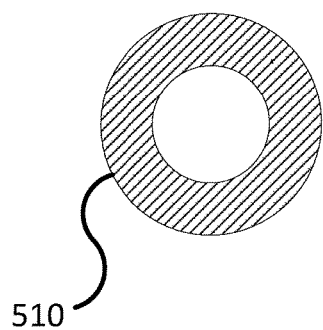
FIGS. 5A-5C illustrate an exemplary helical structure incorporated into an ophthalmic insert device in accordance with the present invention.
Figure 5B:
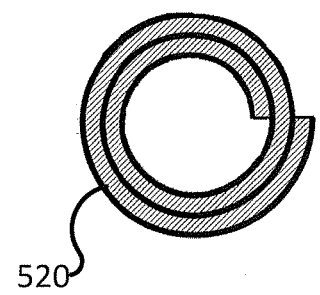
Figure 5C:
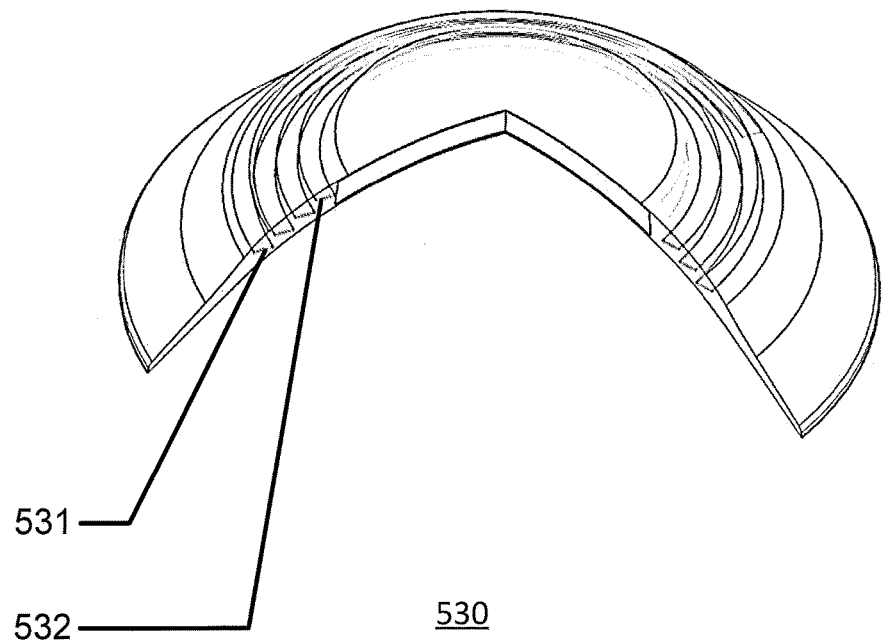

Referring to FIGS. 5A-5C, there is illustrated, in planar view, a three-dimensional embodiment for the placement of electrical components on a thin, flexible circuit board with three-dimensional shapes. A thin, flexible circuit board may be manufactured in an annular shape 510. A dicing operation may cut out the thin pieces into a complex curvilinear shape that, while still flat, may be a spiral shape at 520. Now, the spiral shape may be attached to a three-dimensional surface of a rigid/hybrid insert, for example, as may be seen at 530. The surface, formed in three dimensions, may take the form of a helix. When the spirally shaped thin flexible circuit board 520 is laid upon the helically shaped supporting surfaces, a relatively small and gentle stress may be imparted to the thin flexible circuit board 520 to cause it to assume the helical shape. Since the helical shape does not cause the circuit board 520 to lift in space as it winds radially, which may be seen by the change in vertical location that can be observed between 531 and 532, the resulting helix may be better matched to the typical shape of an ophthalmic lens. The result may be a flexible circuit board that assumes a three-dimensional shape of helix with minimal stress imparted to the substrate itself. The illustration at 530 shows a single, helical, thinned, flexible circuit board component in concert with an insert piece that may be useful for inclusion into ophthalmic devices. In some exemplary embodiments, there may also be stacked implementations of helically shaped pieces and combinations of helical pieces.

Figure 6:
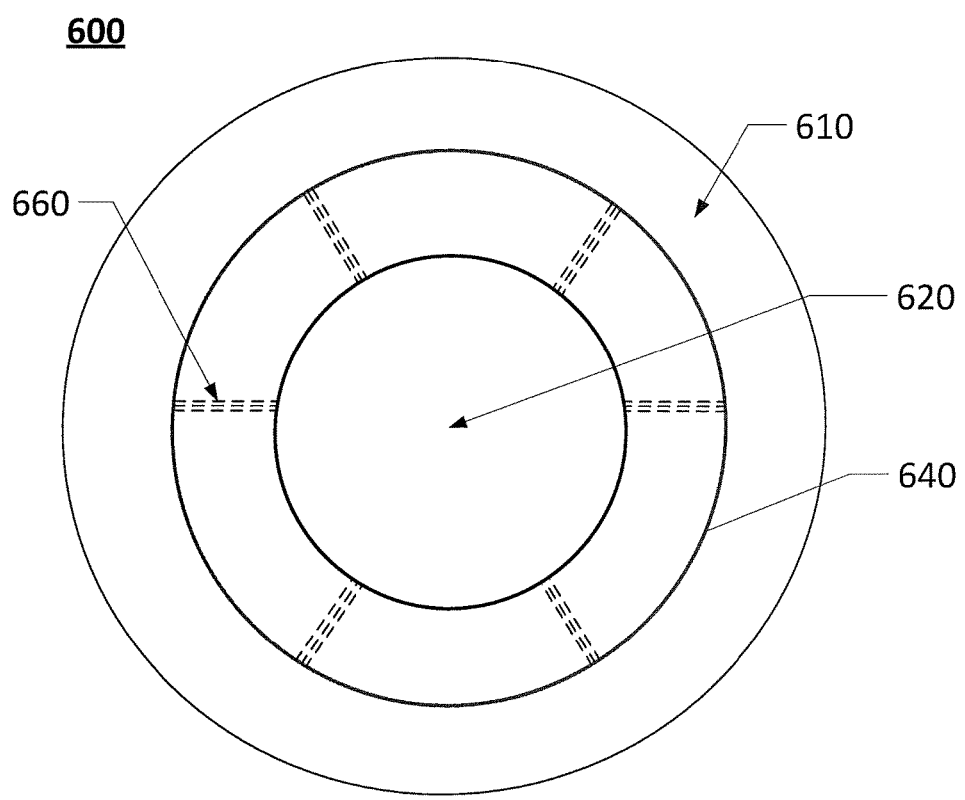
FIG. 6 illustrates an exemplary circular flap for incorporation into an ophthalmic device in accordance with the present invention.

FIG. 6 illustrates, in planar view, an exemplary embodiment of a three-dimensional device 600 for use in an ophthalmic device. An insert 620, which preferably comprises either a rigid or hybrid insert that may contribute to the functionality of the lens, is circumscribed by a circular flap 640. In some exemplary embodiments the circular flap 640 may reinforce/support the electrical components necessary to enable the active focusing capabilities of the insert 620. The circular flap 640 may also be used as a mechanism for collecting medical data from the wearer via sensors and allow for transmission to a medical administrator for assessment. In an effort to eliminate stress/tension, as well as maintain a certain degree of flexibility of the circular flap 640, as well as the overall ophthalmic device, small cuts or perforated regions 660 may be generated. The quantity, position, and layout of the perforated regions 660 may be determined by the desired functionality or vision correction capabilities of the ophthalmic device. The entire three-dimensional substrate 600, which may comprise the insert 620, and the circular flap 640 with the requisite blueprint of perforated regions 660, may be embedded within the polymerized hydrogel material 610 that the ophthalmic device may be formed from.

Some ophthalmic devices comprise a stabilizing feature capable of orienting the ophthalmic lens on the eye, wherein the orientation is capable of aligning the plurality of zones with the astigmatic characteristics of the eye. In some exemplary embodiments the stabilizing feature may add mass to the ophthalmic lens, wherein the mass is sufficient to ballast the ophthalmic lens. In other exemplary embodiments, the stabilizing feature(s) causes the lens to re-align with eyelid blinks due to interactions between the lids and stabilizing features on the contact lens. Referring to FIG. 7A, at 710 there is depicted a planar orthographic side view of the ophthalmic device with additional mass and/or volume 712 necessary to establish the stabilizing feature. In FIG. 7B at 720, it can be observed that this additional mass/volume 712 is distributed from the peripheral zone 722 to the skirt zone 724 of the lens, with a heavier concentration of mass/volume in the skirt zone of the ophthalmic device. In some exemplary embodiments, a network or clusters of circular flaps oriented in a flower like fashion may be implanted into the nucleus of the additional mass/volume designed for the stabilizing feature so that the ophthalmic device may provide multiple functionalities. Referring to FIG. 7C at 730, an enlarged example of the circular flap cluster 732 that may be embedded into the stability zone is depicted.

Figure 8:
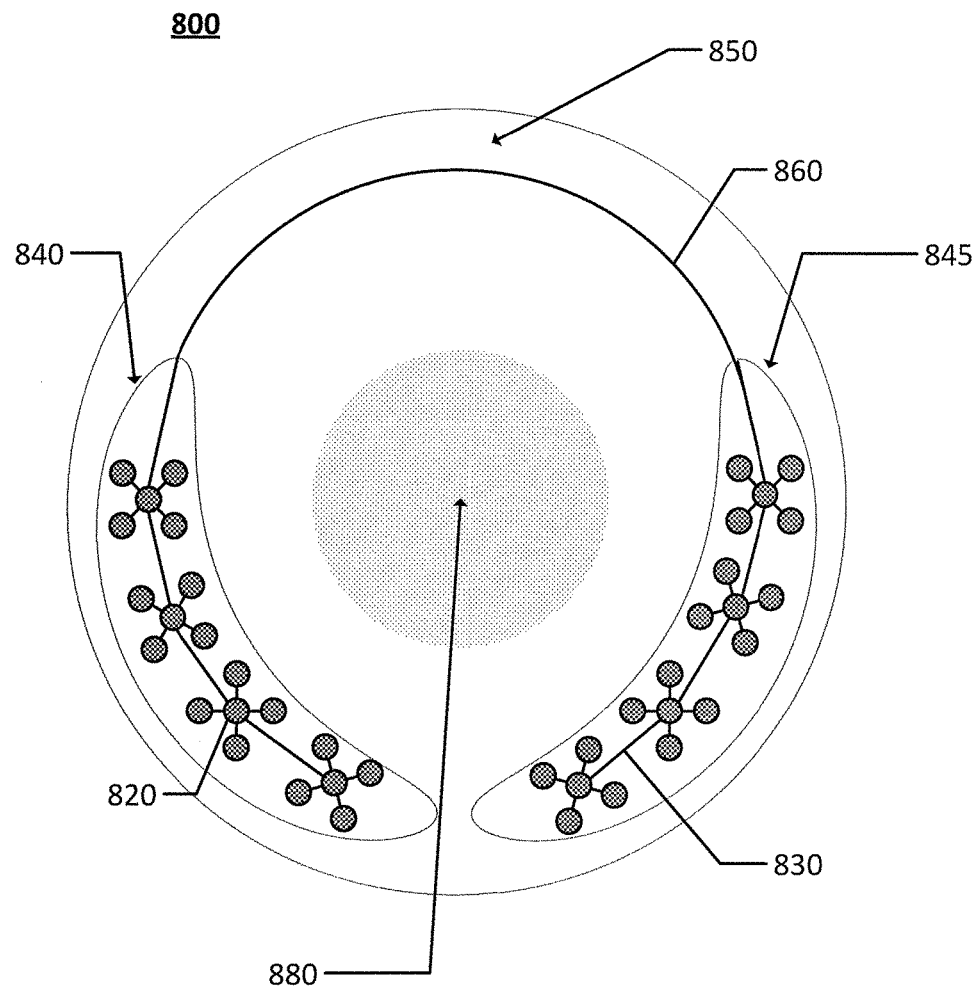
FIG. 8 illustrates a frontal planar view of an ophthalmic device with stability features, and flower-like flap structures incorporated into the ophthalmic device in accordance with the present invention.

FIG. 8 illustrates a planar/flat frontal view of an ophthalmic device preferably comprising stability features 840 and 845. At 850 the material, which may preferably comprise hydrogel polymer that the ophthalmic device may be formed from as well as the soft optic zone 880, is depicted. A heavier concentration of polymerized hydrogel material 850 may be used to mold the stability features 840 and 845 located at equal 120 degree positions within the circumference of the ophthalmic device. A linear arrangement of network/circular cluster, flower-like flaps 820 is created by connecting several networks together via flexible electrical traces 830 is embedded in the nucleus of the mass/volume of polymerized hydrogel 850 that form the stability features 840 and 845. Extended or longer electrical traces 860 extending approximately half of the circumference of the ophthalmic device to connect the structures embedded within the stability features 840 and 845. In some exemplary embodiments the electrical trace 860, which may comprise a single wire, a multiconductor cable, or a flexible metallized polyimide film, may be used to allow communication between the linearly arranged flower-like flaps 820 or to supply information to the networks due to its proximity to the ciliary muscle.

Although shown and described in what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A powered ophthalmic device comprising:
   a lens having an optic zone and a peripheral zone surrounding the optic zone;
   a powered optic device disposed in the optic zone;
   a plurality of discrete flaps formed by separate substrate pieces disposed in the peripheral zone, wherein at least one of the discrete flaps is configured as a mounting structure for one or more electronic components;
   at least one interconnection structure mounted to the powered optic device; and
   a plurality of electrical traces forming electrical connections between each of the plurality of discrete flaps and another of the discrete flaps or an interconnection structure, such that the plurality of discrete flaps form a flexible network between the one or more electronic components and the powered optic device.

2. The powered ophthalmic device according to claim 1, wherein the lens comprises a contact lens.

3. The powered ophthalmic device according to claim 1, wherein the lens comprises an intraocular lens.

4. The powered ophthalmic device according to claim 1, wherein the powered optic device comprises a variable optic device.

5. The powered ophthalmic device according to claim 1, wherein the discrete flaps range in size from about 1 square micron to about 1 square millimeter.

6. The powered ophthalmic device according to claim 1, wherein the flexible network formed by the plurality of discrete flaps forms a topology forming shapes comprising: graticulate, botryoidal, acicular, gusset, prolate, lozenge, mammillated, rhombus or rhomboid, or freeform contours arranged in a network or reticulum fashion.

7. The powered ophthalmic device according to claim 1, wherein at least one of the plurality of discrete flaps comprises a truncated conical frustum or flower-like shape.

8. The powered ophthalmic device according to claim 1, wherein at least one of the plurality of discrete flaps is formed from a thin flexible polymer.

9. The powered ophthalmic device according to claim 1, wherein a size of the least one interconnection structures is modulated to cover various circumferences around the powered optic device.

10. The powered ophthalmic device according to claim 1, wherein at least one of the at least one interconnection structures comprises a flexible insulating substrate.

\* \* \* \* \*